Feb. 1, 1966    S. J. GARBARINO, JR., ET AL    3,232,585
FOAM SPRAY SYSTEM
Filed May 15, 1964    3 Sheets-Sheet 1

STEVEN J. GARBARINO JR.
WARREN H. COWLES
INVENTOR.

BY

Feb. 1, 1966    S. J. GARBARINO, JR., ETAL    3,232,585
FOAM SPRAY SYSTEM

Filed May 15, 1964    3 Sheets-Sheet 2

STEVEN J. GARBARINO JR.
WARREN H. COWLES
INVENTOR.

BY

Feb. 1, 1966 S. J. GARBARINO, JR., ET AL 3,232,585
FOAM SPRAY SYSTEM
Filed May 15, 1964 3 Sheets-Sheet 3

STEVEN J. GARBARINO JR.
WARREN H. COWLES
INVENTOR.

BY

United States Patent Office 3,232,585
Patented Feb. 1, 1966

3,232,585
FOAM SPRAY SYSTEM
Steven J. Garbarino, Jr., Warren, and Warren H. Cowles, Birmingham, Mich., assignors to Holley Carburetor Company, Warren, Mich., a corporation of Michigan
Filed May 15, 1964, Ser. No. 367,754
5 Claims. (Cl. 259—4)

This invention relates to a ratio metering device, and more particularly to a portable type foam spray system having a metering device for mixing two liquid components in the proper volume ratio to produce a desired foam.

There is a need for a simple and inexpensive system for spraying plastic foam. For example, it has been proposed to spray a foam on the walls of a mine to reduce the danger of explosion and other undesirable effects of dust. In this case, it is desirable to have a light-weight, portable system that can be carried and operated by one man and that does not require electric power. Any cleaning of parts with toxic or explosive solvents or any refilling of component containers could easily be done in a central supply area, possibly outside the mine. As presently contemplated, the equipment should be capable of delivering a reasonable quantity of foam in a relatively short time.

Accordingly, a main object of the invention is to provide a portable, self-contained, one-shot foam spray system.

Another object of the invention is to provide such a system that is made ready for subsequent use merely by refilling the component tanks and recharging the pressure driving medium container.

Another object of the invention is to provide such a system which is easy and inexpensive to construct, operate and service.

Another object of the invention is to provide such a system that does not require electric or other power likely to create sparks that could touch off an explosion.

A still further object is to provide such a system that is pneumatically powered.

Still another object of the invention is to provide a novel and inexpensive device for delivering components necessary to produce a foam to a mixing chamber in a constant volume ratio.

Another object of the invention is to provide such a device in which the volume ratio of components delivered may be easily changed.

These and other objects of the invention will become more apparent upon reference to the following specification and the accompanying drawings wherein.

Figure 1:
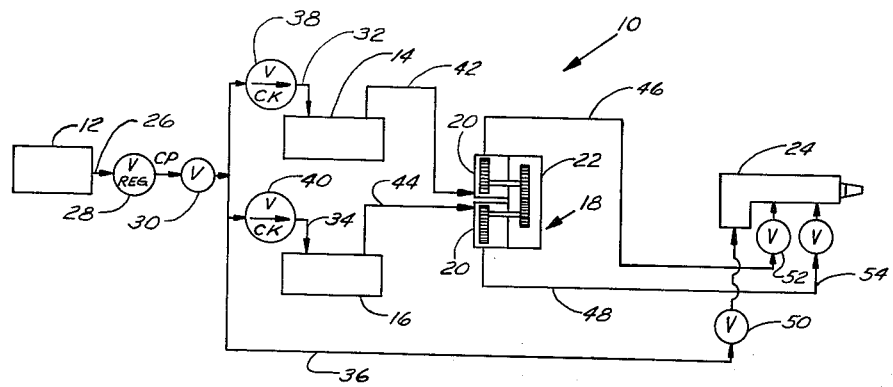
FIGURE 1 is a diagrammatic illustration of a complete system embodying the invention.

Referring now to FIGURE 1, a foam generating and applicating system 10 embodying the invention includes a compressed air tank 12, a container 14 for a liquid resin and a container 16 for a liquid catalyst. The system also includes a constant volume ratio metering device 18 which comprises a pair of identical displacement, gear-type hydraulic motors 20a and 20b directly coupled through a gear box 22 to provide a constant speed ratio between the two motors. The other element of the system is a spray gun 24 having a suitable mixing chamber and a spray nozzle.

The conduit 26 from the compressed air tank includes a pressure regulating valve 28 and an ordinary on-off valve 30 so as to supply air under a regulated pressure to the conduits 32, 34 and 36 leading to the tank 14, tank 16 and the gun 24, respectively. The conduits 32 and 34 leading to the tank 14 and the tank 16 preferably include check valves 38 and 40 to prevent any possibility of the liquid constituents escaping back to the air tank 12. Discharge conduits 42 and 44 from the tanks 14 and 16, respectively, connect to the input side of one of the hydraulic motors 20b and 20a, and output conduits 46 and 48 from the motors supply the mixing chamber of the spray gun. The conduits 36, 46 and 48 may include on-off valves 50, 52 and 54, respectively, the valves being located at or near the gun so as to be under easy control of the operator.

Figure 2:
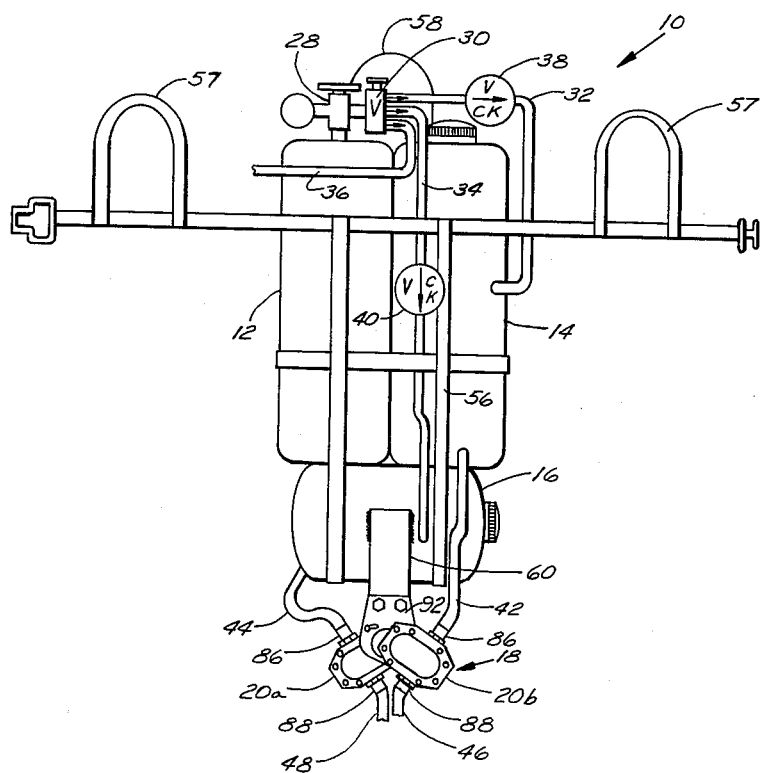
FIGURE 2 is an elevational view of a portable apparatus which embodies the invention and which could be carried and operated by one man.
Figure 4:
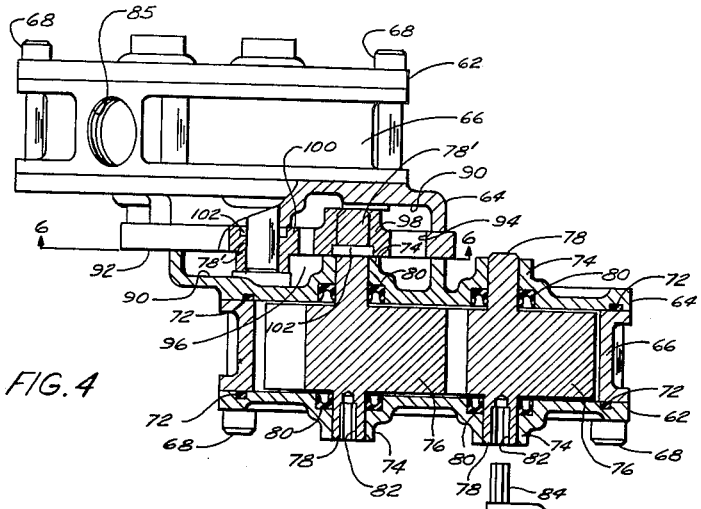
FIGURE 4 is a top plan view of the ratio device shown by FIGURE 3, with portions thereof cut away and in cross-section to better illustrate the internal construction, the cross-section being taken along the plane of line 4—4 of FIGURE 3 and looking in the direction of the arrows.
Figure 3:
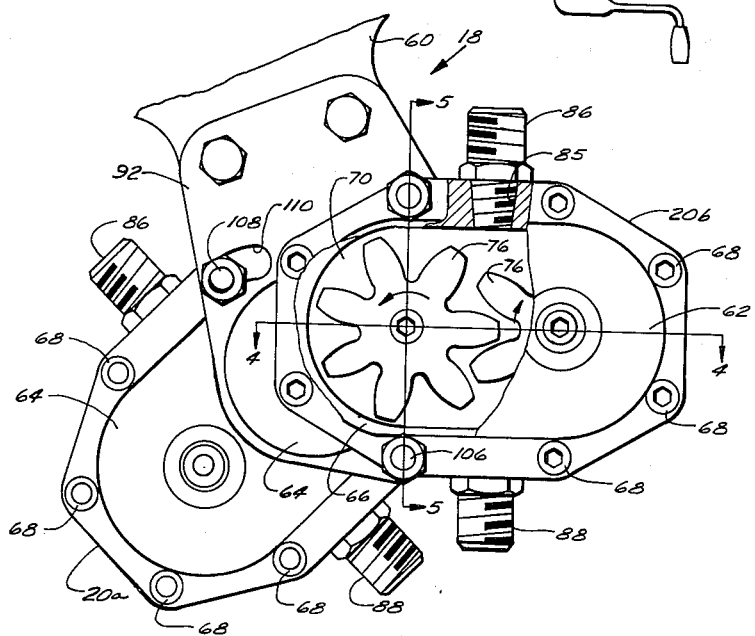
FIGURE 3 is an enlarged view of the ratio device shown in the lower portion of FIGURE 2, with portions thereof cut away and in cross-section.
Figure 5:
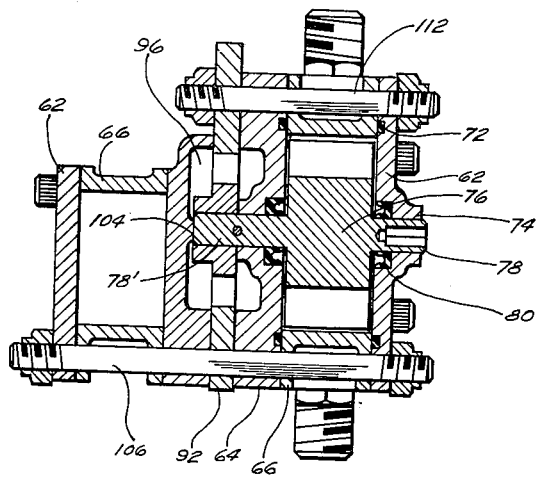
FIGURE 5 is a cross-sectional view taken on the plane of line 5—5 of FIGURE 3 and looking in the direction of the arrows.
Figure 6:
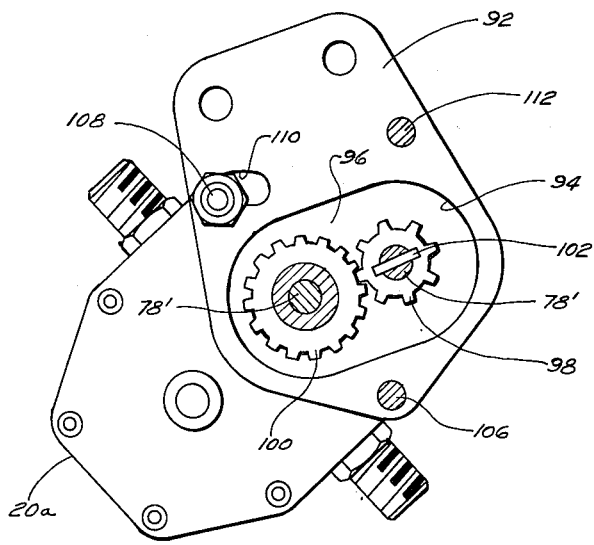
FIGURE 6 is a cross-sectional view taken on the plane of line 6—6 of FIGURE 4 and looking in the direction of the arrows.

FIGURE 2 illustrates a possible arrangement of the system 10, except for the gun 24, the harness 56 having shoulder straps 57 enabling the system to be strapped to the back of an operator wearing a helmet 58. The operator could open valves 28 and 30 before he put the equipment on and open the valves 50, 52 and 54 when he was ready to spray the foam. The metering device 18 may be secured in any desired manner to the container 16, as by bolting to a bracket 60 welded to the tank.

As seen in FIGURES 1 and 2, the system 10 can be arranged so that when the valves 28 and 30 are opened, compressed air at a regulated pressure is supplied from the tank 12 to the container 14 to pressurize the liquid resin therein; likewise, air from the tank is supplied to the container 16 to pressurize the liquid catalyst. Liquid resin under pressure is thus supplied to the intake of the hydraulic motor 20b, while catalyst under pressure is supplied to the intake of the hydraulic motor 20a, which causes the hydraulic motors to operate.

Since the motors 20a and 20b are of identical displacement, if their speeds were identical they would supply identical volumes of the liquid constituents to the mixing chamber of the spray gun 24. Actually, the two motors are directly coupled through a gear box 22 so that their speeds are in some predetermined constant ratio, depending upon the ratio of the meshing gears. For example, if the desired volume ratio of resin to catalyst to produce a suitable urethane foam were 1.4:1, then the interchangeable meshing gears in the gear box 22 would be selected to have a ratio of 1.4:1 so as to maintain a 1.4:1 speed ratio and thus supply the proper volume ratio of the two constituents. The air from the tank 12 may also be supplied to the mixing chamber of the spray gun 24 to assist in mixing of the constituents and propelling the resulting foam.

Referring now to FIGURES 3–6 it will be seen that the ratio metering device 18 comprises a pair of identically constructed gear type hydraulic motors 20a and 20b. Thus, the same reference numerals may be employed in describing the identical parts thereof.

Each motor comprises an outer end plate 62 and an inner end plate 64 secured to the opposite sides of an intermediate peripheral housing element 66 by any suitable means such as the screws 68 to provide a gear chamber 70. A peripheral seal 72 is provided for each end plate to prevent leakage of the liquid from the chamber 70. Each end plate has two bearing journals 74 formed therein so that when the end plates are secured to the intermediate member 66 one journal in each end plate will be aligned with a journal on the other end plate. The chamber 70 contains a set of meshing gears 76 having their integral shafts 78 received in the aligned journals 74, the gears being identical except that one gear has a longer shaft 78' at one side thereof so that it extends beyond its journal in the inner end plate 64. A seal 80 is provided at each shaft, and the outer ends of the shafts are formed with a non-circular cavity 82 into which a crank 84 may be inserted to start the motor in operation if that should become necessary.

The intermediate member 66 is formed with threaded openings 85 to receive the inlet fitting 86 and the outlet fitting 88. As customary in the case of gear type hydraulic motors or pumps, the clearance between the gears 76 and the end walls of the member of the chamber 70 is such that fluid under pressure supplied at the inlet 86 will cause the gears to turn in the direction of the arrows. In the case of the motor, the fluid is carried between the gear teeth and discharged through the outlet 88 at a pressure below inlet pressure.

As stated previously, the two motor assemblies 20a and 20b are exactly identical, and it will be noted that the inner end plates 64 are formed with a recess 90. The metering device 18 includes an intermediate plate 92 having an opening 94 so that when the motors 20a and 20b are assembled on opposite sides of the plate, a closed chamber 96 is formed to receive a set of meshing gears 98 and 100, one gear being fixed for rotation with each of the longer shafts 78' extending into the chamber 96.

The means of fixing the gears 98 and 100 for rotation with the shafts 78' may comprise a loose pin 102 extending diametrically through each shaft 78' and recesses in the side of each gear adjacent the journal 74 for receiving the pin. In other words, the pin 102 is merely slipped through the shaft and the gear is then slipped on the shaft so that the pin is received in the recesses. Since the shafts 78' extend all the way across chamber 96 to a small boss 104 and since the hubs of the gears 98 and 100 extend from the journals 74 and substantially to the opposite wall of the chamber 96, the gears are sufficiently mounted and contained axially.

The two motors 20a and 20b and the intermediate plate 92 are secured in assembled relationship, with the gears 98 and 100 in mesh, by means of a single long pivot bolt 106 extending through both motors and the plate, a second bolt 108 extending only through one of the motors and the curved slot 110 in the plate and a third bolt 112 extending through the plate and the other motor. This arrangement of securing the two motors 20a and 20b enables adjustment of the distance between the two shafts 78' in the chamber 96 so as to permit other sets of gears having different ratios to be mounted on the shafts 78'.

From the above description, it will be seen that there has been provided an extremely simple and accurate ratio device that may be used in a self-contained, portable foam spray system. As compared to systems presently known, the system is easy to manufacture and maintain. Since it does not require electrical power, it may be employed in areas such as mines where the danger of explosion will not permit the use of electrically driven apparatus. Within limitations, the volume ratio delivered by the ratio device can be easily changed. Since it is a relatively low cost unit, several may be kept on hand so that while some are being used the spares can be cleaned and recharged in a safe central supply area.

In certain applications it may be possible to eliminate the air tank 12 and the conduits associated with the tank and to use the crank 84 to manually drive the ratio device. In that event, the motors 20a and 20b will be acting as gear pumps which, due to their being coupled through gear box 22 will deliver the constituents in a constant volume ratio. Such an arrangement could be employed where pressures generated by the gear pumps are sufficient to mix the constituents and propel the resulting foam.

It is apparent that the ratio device is not limited to use in a foam apparatus, but could be employed whereever it is desired to mix liquid components in a fixed volume ratio. Also, it is apparent that any number of motors could be coupled so as to mix more than two components.

While a preferred embodiment and one modification have been shown and described for purposes of illustration, other modifications may be possible within the scope of the appended claims.

What we claim as our invention is:

1. A constant volume ratio metering device, comprising at least two identical displacement gear-type hydraulic motors, said motors having interchangeable parts including a housing assembled from a pair of end plates secured to a hollow intermediate member, a pair of shafts mounted in parallel relation in said housing, said shafts being sealed at the end plates, a pair of identical meshing gears in said housing, each of said gears being fixedly secured to one of said shafts, one of said shafts extending beyond one of said end plates, said housings being pivotably mounted at opposite sides of an intermediate plate formed to provide a chamber receiving said extending shafts, a gear mounted on each of said extending shafts, said gears being meshed to maintain a constant speed ratio between said motors, said pivotable mounting of said motors providing for adjustment of the distance between said extending shafts so that the speed ratio between said motors may be varied by changing the meshing gears mounted thereon.

2. A constant volume ratio metering device, comprising at least two housings, each including a hydraulic motor, said hydraulic motors having the same displacement per revolution and each having a fluid inlet and a fluid outlet and an output shaft, said output shafts being directly coupled by gears so as to maintain the relative speeds of said motors constant, and means for pivotally connecting said housings so that the ratio of the gears connecting said shafts may be changed to change the speed ratio of said motors.

3. Apparatus for mixing two liquid components in a fixed volume ratio, said apparatus comprising a compressed air source; separate containers for each of said liquid components; conduit means for supplying the compressed air to each of said containers to pressurize the contents thereof; a constant volume ratio metering device including two identical displacement gear-type hydraulic motors, said motors having interchangeable parts including a housing assembled from a pair of end plates, a hollow intermediate peripheral element, a pair of rotatable shafts mounted at the ends thereof in said end plates, a pair of identical meshing gears, each of said gears being fixedly secured to one of said shafts within said hollow intermediate element, one of said shafts extending beyond one of said end plates, a separate plate having an opening therein mounted between said plates having said shafts extending therefrom, said end plates and said intermediate plate forming a closed chamber, a gear mounted on each of said extending shafts in said closed chamber, said gears being meshed to maintain a constant speed ratio between said motors; fastening means associated with said intermediate plate and said adjoining end plates for pivotally mounting said housing relative to one another in order to vary the distance between said extending shafts to accommodate different sizes of said latter mentioned meshing gears; conduit means for delivering the contents of each of said containers to one of said housings; a mixing chamber for said liquid components; conduit means for delivering the components passing through each of said motors to said mixing chamber; and an additional conduit communicating between said compressed air source and said mixing chamber.

4. A portable apparatus for spraying a plastic foam, said apparatus comprising a first container for compressed gas, a conduit leading from said first container, said conduit having a main valve, a pressure gauge and a pressure regulating valve therein, a second container for one of the fluids required to be mixed to produce said foam, a conduit including a check valve leading from said pressure regulating valve to said second container to pressurize the contents thereof, a third container for a second fluid required to be mixed to produce said foam, a conduit including a check valve leading from said pressure regulating valve to said third container, a fixed volume ratio mixing device, said device comprising a pair of identically formed and identical displacement gear-type hydraulic motors, each of said motors comprising a housing containing a pair of identical meshing shaft-mounted gears, one of said shafts extending outside of said housing and having a gear mounted thereon externally of said housing, said housings being mounted on a common pivot so as to be angularly adjustable with respect to one another, thereby providing for interchangeability and meshing of said external gears in order to provide variable fixed volume ratios, a conduit from said second container to an inlet of one of said housings, a conduit from said third container to an inlet of the other of said housings, a spray gun having a mixing chamber and a nozzle, a conduit leading from the outlet of each of said housings to said mixing chamber, a conduit from said first container to said mixing chamber, each of said three last named conduits including a valve positioned near said mixing chamber, said apparatus being of such weight and size and provided with a shoulder type harness so as to be carried and operable by a single person.

5. A portable apparatus for spraying a plastic foam, said apparatus comprising a first container for compressed gas, a conduit leading from said first container, said conduit having a pressure regulating valve therein, a second container for one of the fluids required to be mixed to produce said foam, a conduit including a check valve leading from said pressure regulating valve to said second container to pressurize the contents thereof, a third container for a second fluid required to be mixed to produce said foam, a conduit including a check valve leading from said pressure regulating valve to said third container, a fixed volume ratio mixing device, said device comprising a pair of identically formed and identical displacement gear-type hydraulic motors, each of said motors comprising a housing containing a pair of identical meshing shaft-mounted gears, one of said shafts extending outside of said housing and having a gear mounted thereon externally of said housing, said housings being mounted on a common pivot so as to be angularly adjustable with respect to one another, thereby providing for interchangeability and meshing of said external gears in order to provide variable fixed volume ratios, a conduit from said second container to an inlet of one of said housings, a conduit from said third container to an inlet of the other of said housings, a spray gun having a mixing chamber and a nozzle, a conduit leading from the outlet of each of said housings to said mixing chamber, and a conduit from said first container to said mixing chamber, each of said three last named conduits including a valve positioned near said mixing chamber.

References Cited by the Examiner
UNITED STATES PATENTS

| | | | |
|---|---|---|---|
| 2,438,462 | 3/1948 | Smith | 137—99 |
| 2,599,680 | 6/1958 | Weeks | 137—567 |
| 3,123,306 | 3/1964 | Bradley | 259—9 |
| 3,156,535 | 11/1964 | Humphreys | 259—8 |

WALTER A. SCHEEL, *Primary Examiner.*

CHARLES A. WILLMUTH, *Examiner.*